Oct. 26, 1954
E. BOMAN
2,692,470
FRUIT GATHERER
Filed Oct. 29, 1951
3 Sheets-Sheet 1
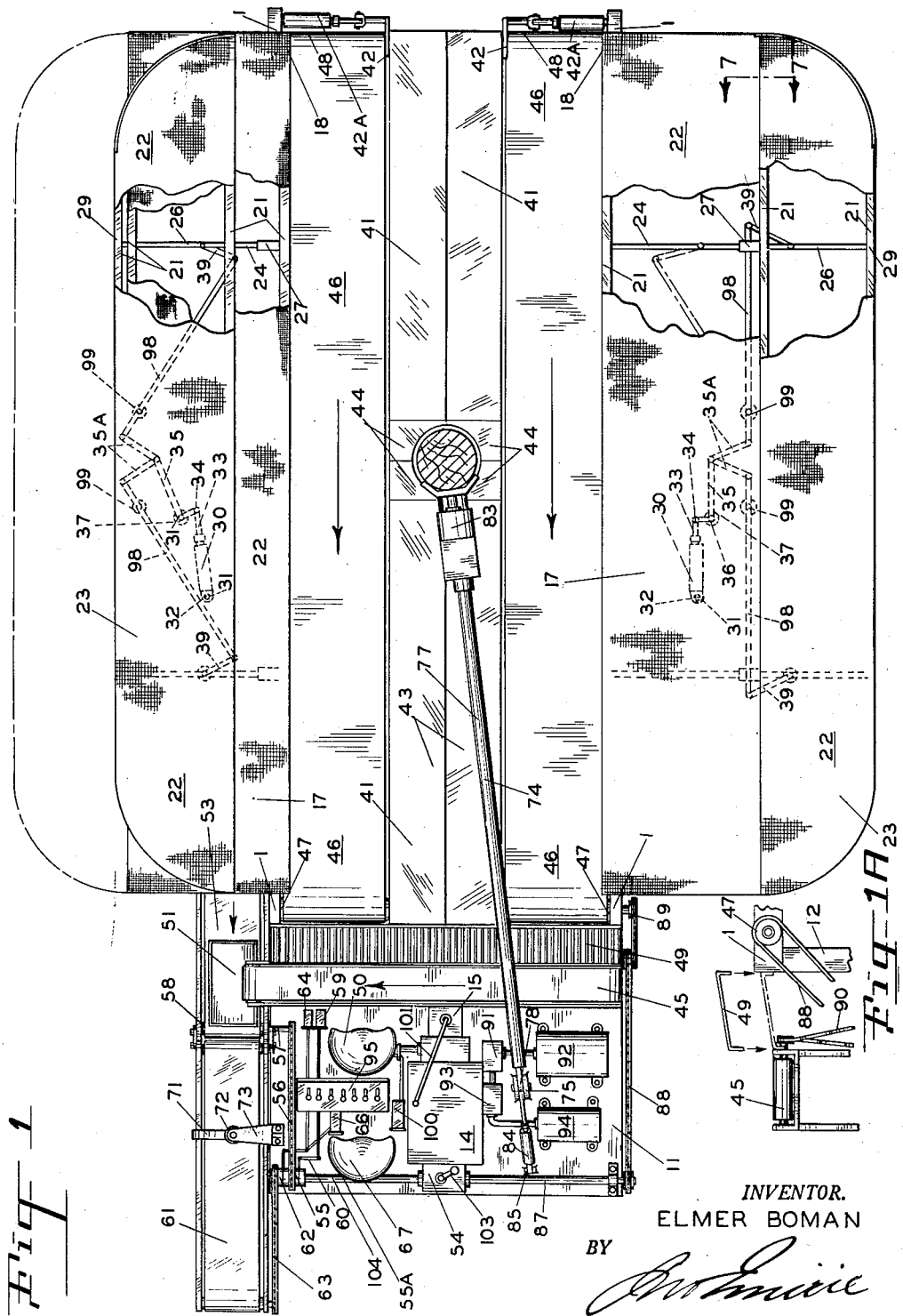
INVENTOR.
ELMER BOMAN
BY
ATTORNEY

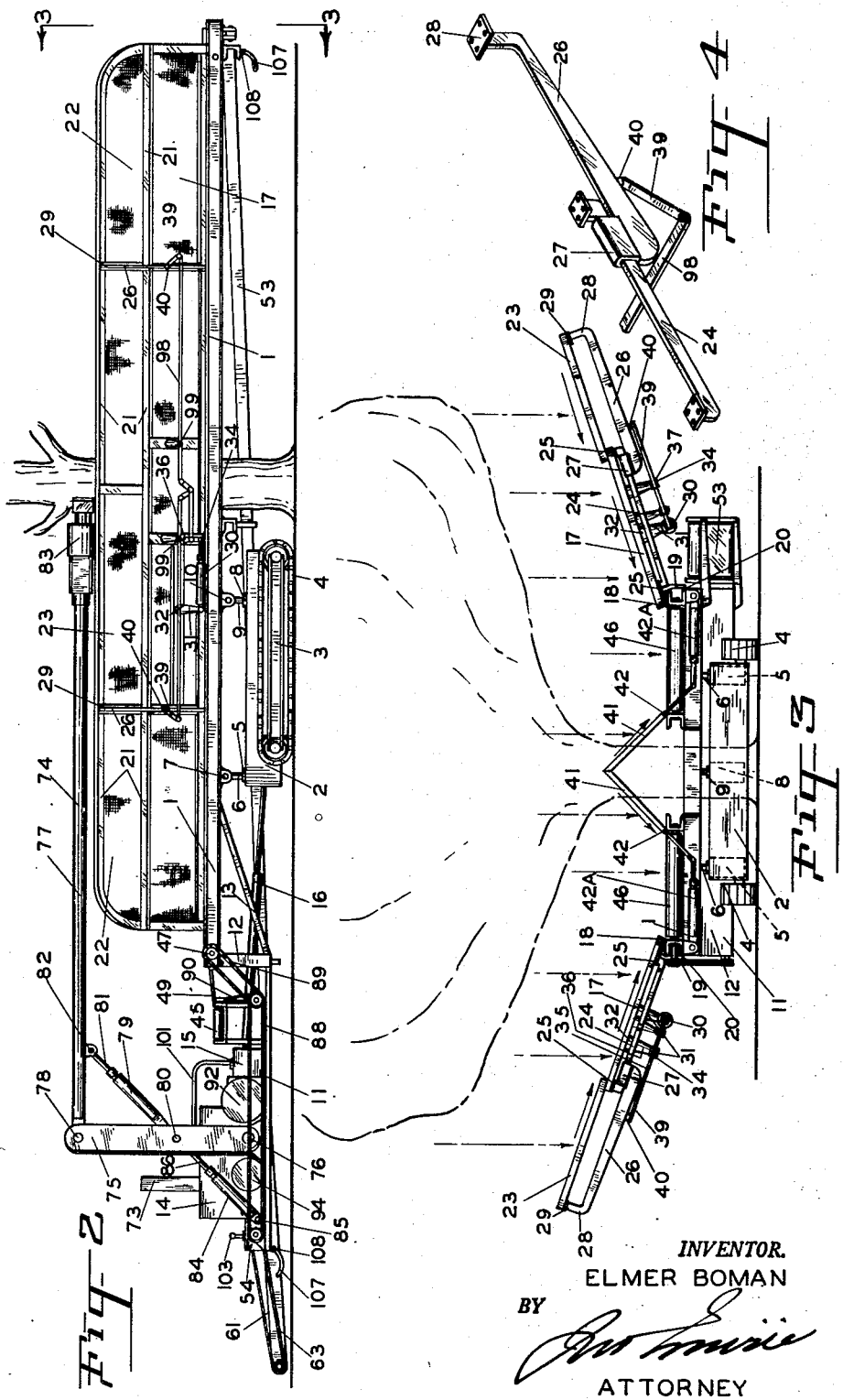

Oct. 26, 1954     E. BOMAN     2,692,470
FRUIT GATHERER
Filed Oct. 29, 1951     3 Sheets-Sheet 3
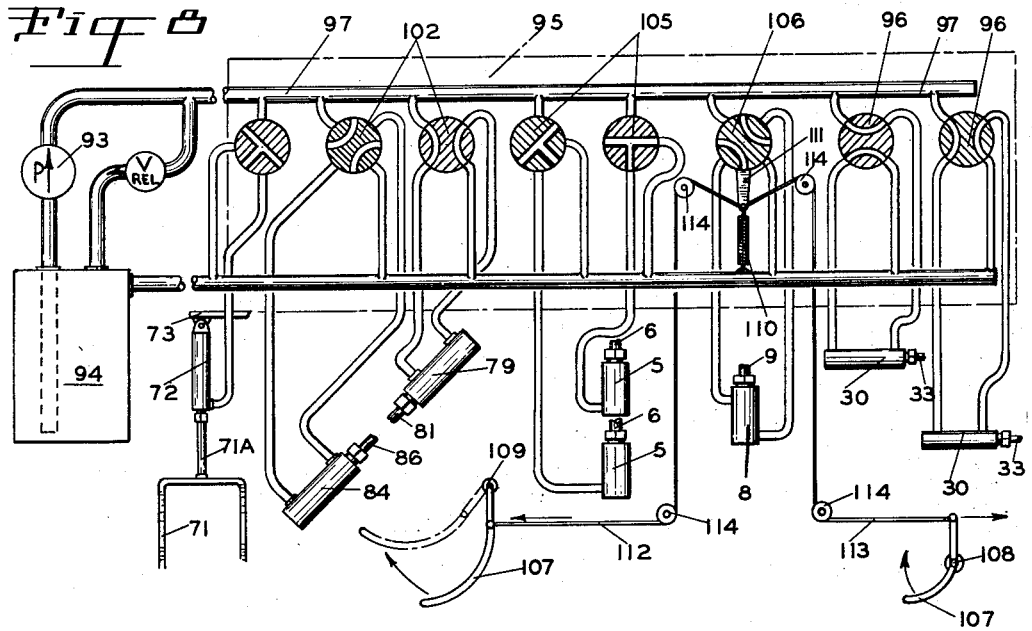
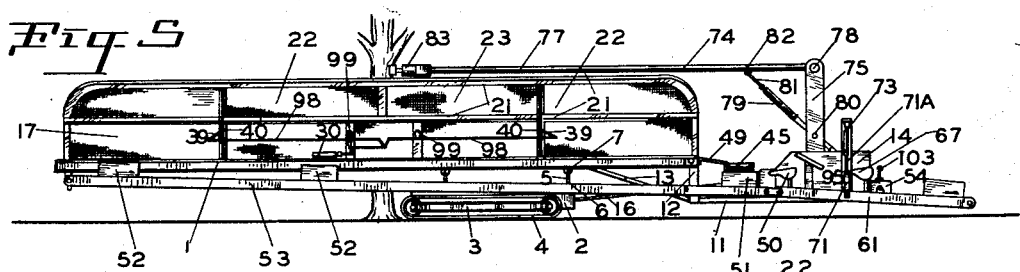
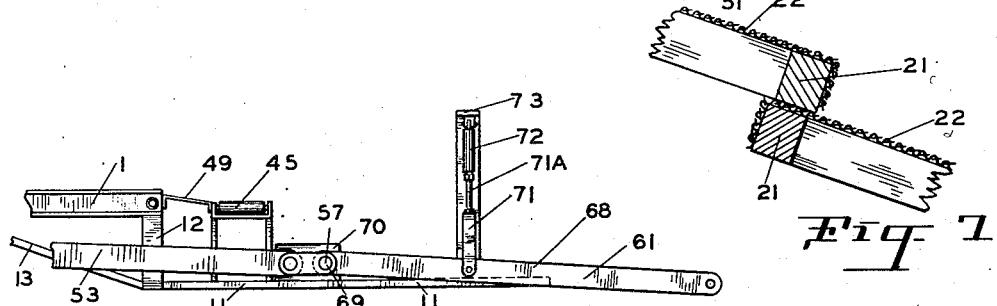
INVENTOR.
ELMER BOMAN
BY
ATTORNEY Patented Oct. 26, 1954

2,692,470

UNITED STATES PATENT OFFICE 2,692,470

FRUIT GATHERER

Elmer Boman, Dallas, Oreg., assignor of one-half to Donald P. Boman, Dallas, Oreg.

Application October 29, 1951, Serial No. 253,606

4 Claims. (Cl. 56—328)

This invention relates to nut and fruit picking machines and is particularly adapted to the method of picking fruits or nuts wherein the tree is shaken, causing the nuts or fruit to fall on to a gathering table.

The primary object of this invention is to provide a gathering table mounted upon supporting tracks adapted to embrace the nut or fruit tree providing a receiving table underneath the branches of the tree.

A further object of the invention is the provision of means for collapsing or folding the table while moving from one tree to another.

Another object of the invention is the provision of conveyor belts forming part of the receiving table for transferring the nuts or fruits to a grading and sorting table mounted upon the picker.

A still further object of the invention is the provision of a conveyor for supporting containers or boxes which are bought under the sorting table to be filled with nuts or fruits from the table.

Another object of the invention is the provision of a conveyor belt for delivering the filled boxes or containers from the sorting table to the ground surface.

Still another object of the invention is the mounting of a tree shaking device on the picking machine for shaking the nuts and fruits from the tree on to the receiving table.

These and other incidental objects will be apparent in the drawings, specification and claims.

Referring to the drawings:

Figure 1 is a plan view of my new and improved picking machine, illustrating the tree shaker in contact with the tree. One side of the table fully extended while the opposite side is partially folded, parts broken away for convenience of illustration.

Figure 1A is an enlarged fragmentary detail elevational view of the conveyor, grader and sorting table.

Figure 2 is a side view of Figure 1.

Fgure 3 is an end view, taken on line 3—3 of Figure 2, looking in the direction indicated.

Figure 4 is an enlarged fragmentary detail perpsective view of the table supporting and extension mechanism.

Figure 5 is a side view on a reduced scale of the opposite side of that shown in Figure 2.

Figure 6 is an enlarged fragmentary detail view of part of the catching table, sorting table and box conveyor belts.

Figure 7 is an enlarged detail sectional view of the sorting table taken on line 7—7 of Figure 1.

Figure 8 is a diagrammatical lay out of a portion of the hydraulic system employed to carry out the various objects of my invention.

Referring more specifically to the drawings:

My new and improved nut and fruit picking machine consists of a horizontal framework 1, which is mounted on the frame 2 of the mobile track supporting unit 3. The mobile track supporting unit consists of a frame 2 supported by the usual tracks 4 of well known design. The frame 1 is supported by a pair of hydraulic cylinders 5 mounted within the frame 2 of the mobile track supporting unit 3, having their piston rods 6 pivotally connected at 7 to the framework 1.

A single hydraulic cylinder 8 is fixedly mounted within the frame 2 of the mobile track supporting unit 3 and has its piston rod 9 pivotally connected at 10 to the central portion of the framework 1, providing a three-point suspension between the track frame 3 and the frame 1 of the picking machine. The object of which will be more fully described later on.

A platform 11 is supported by the framework 1 by the vertical frames 12 and the braces 13. A power plant 14 is mounted to the platform 11 and drives the tracks 4 from the transmission 15 and drive shaft 16 in the usual manner. I have not attempted to illustrate the steering mechanism, but it would be of a standard design as used in connection with crawler type tracks.

Tables 17 are hingedly connected to the framework 1 at 18, and are held at the angle illustrated best in Figure 3 by the brackets 19 bearing against the edge of the frame 1 at 20.

Referring to Figure 7, I illustrate an enlarged detail of the table structure, which consists of framework 21 across the top of which is stretched resilient material, as for instance fabric 22 upon which the fruit or nuts fall. This framework is further illustrated throughout the various views.

The extensible tables 23 rest on top of the tables 17 and are supported by the extensible frame mechanism illustrated in Figure 4. The frame or track 24 is fixedly secured underneath and to the framework of the tables 17 at 25. The movable bracket 26 is adapted to slide on the track 24 as at 27, its outer end 28 being connected and secured to the table 23 at 29. There are two of these table extension mechanism on each side of the table assembly, as best illustrated in Figures 1 and 2.

When the picker is moved from one tree to another the outside tables 23 are retracted, as illustrated in Figure 1 on the upper side of the drawings, or when the machine is to be moved over the highway, they are retracted and the tables 17 are hinged or folded over the framework 1 of the machine, including the tables 23. The tables 23 are moved in or out by hydraulic cylinders 30, which are pivotally connected to the underside of the tables 17 by way of the brackets 31 at 32.

The piston rods 33 are pivotally connected at 34 to the bell cranks 35, which are pivoted to the underside of the table 17 by way of the brackets 36 at 37. The cranks 35 are connected to the levers 98 by the links 35A. The levers 98 are pivotally connected at 99 to the underside of the table 17, best illustrated in Figures 1, 2 and 3. The opposite ends of the levers 98 are pivotally connected to the links 39, which in turn are pivotally connected at 40 to the bracket 26. The operation of which can be readily understood by referring to Figures 1, 2, 3 and 4.

Deflectors 41 are hingedly connected to the frame 1 at 42 and are brought to the position illustrated in the drawings when the machine has been brought to the proper position in regards to the tree. Deflectors 43 remain stationary and are not necessarily hingedly secured to the frame. Flexible material 44 is secured to the inner ends of deflectors 43 as well as to the inner ends of deflectors 41 and the inner edges of the flexible material 44 engages and surrounds the tree when the deflectors 41 are brought into place. These deflectors are pivoted about their pivot points 42 by hydraulic cylinders 42A, as best illustrated in Figures 1 and 3. I have not illustrated the valve control for this, but these cylinders are operated in both directions positively by a four-way valve from the operator's seat 67.

When the fruit or nuts falls on the table they are conveyed to the sorting belt by the conveyors 46, which run throughout the length of the table in spaced longitudinal relation to each other thus forming part of the table. Thus a longitudinally extending slot is provided that extends from the front of frame 1 past the center thereof to accommodate a tree trunk. The belts 46 are trained about the driving rollers 47 and the idling rollers 48. The nuts or fruit are delivered on to the grading unit 49, consisting or rods spaced apart a distance depending on the size of nuts or fruit being sized.

The grading unit 49 is interchangeable, depending upon the use to which the grader is being put to, referring to Figure 1A. From the grader unit 49 the product is delivered on to the sorting belt 45 behind which a fruit sorter sits on the seat 50 where he can sort the fruit before the same is delivered into the box 51. Empty boxes 52, as best illustrated in Figure 5, are supported by the conveyor belt 53.

A power take-off unit 54 is mounted to the power plant 14 and drives the conveyor 53 through the clutch mechanism 55 by way of the shaft 55A, drive chain 56, into the shaft 57, which drives the belt roller 58. This clutch may be operated by the foot pedal 59 and its connecting link mechanism 60 by the fruit sorter setting on the seat 50.

The conveyor belt 61 is driven by the clutch mechanism 62 by way of the drive belt 63. This clutch is controlled by the foot pedal 64 and the connecting link mechanism 65 by either the fruit sorter, or it may be controlled by the foot pedal 66 by the operator of the picking machine who sits on the seat 67.

Referring to Figure 6, the conveyor frame 68 of the conveyor belt 61 is pivotally mounted at 69 to the supporting bracket 70 mounted to the platform 11. It is raised and lowered and supported by the bridle 71 and piston rod 71A of the hydraulic cylinder 72, which is supported by the bracket 73 mounted to the platform 11, the operation of which will be later described.

In order to shake the nuts or fruit from the tree, I have mounted a tree shaker 74 to the platform 11 by way of the pedestal 75, which is pivotally mounted to the platform at 76 at its lower end, and having the horizontal boom 77 pivotally mounted at 78 at its upper end. The boom being raised and lowered by the hydraulic cylinder 79 which is pivotally mounted at 80, having its piston rod 81 pivotally mounted to the boom at 82. This governs the height of the end 83 of the shaking boom in regards to the tree.

In the event the tree is sloping or is located on a side hill, the hydraulic cylinder 84, which is pivotally connected to the platform 11 at 85 having its piston rod 86 pivotally connected at 89 to the pedestal 75. This will control the forward and backward position of the end 83 of the boom against the tree when operated by the operator sitting on the seat 67. I have not attempted to show the operating mechanism within the end 83 of the tree shaker, as the mechanism concerning the shaker is already being manufactured. I have merely illustrated how it can be mounted to my new and improved nut and fruit picking machine.

Most tree shakers are operated by air so I have provided an air pump 91 driven by the power plant 14 and having an air reservoir 92, referring to Figure 1. In order to operate the hydraulic cylinders throughout the picking machine, I have provided a hydraulic pump 93, which receives its liquid from the reservoir 94, referring particularly to Figure 8.

The conveyor belts 46 and the sorting belt 45 of the sorting table are driven from the power take-off 54 by way of the shaft 87, belts 88, 89 and 90, referring to Figures 1 and 2.

I will now describe the operation of my new and improved nut and fruit picking machine. The operator of the machine sits on the seat 67 and operates the controls located on the control panel 95 as follows. First, he operates the hydraulic cylinders 30, pulling in the extensible tables 23 as shown on the upper side of Figure 1 from the broken line position. This is done by operating the four-way valves 96 which receive hydraulic fluid from the manifold 97 from the pump 93 and reservoir 94, operating the cylinders 30 in a direction to pull the tables inwardly as shown, by causing the piston rod 33 to extend pivoting the crank arm 35, which pivots the levers 98 about their pivots 99, pulling the links 39 and the brackets 26 along the tracks 24 as indicated in Figure 1 on the upper portion of the drawing.

The machine is then moved forward by the operator sitting on the seat 67 by operating the clutch pedal 100 and the gear shift lever 101 so as to cause the machine to move forward, embracing the tree between the forward ends of the conveyors 46 and the frame 1, after which the deflectors 41 are moved to the position shown in the drawings by the cylinders 42A. The end 83 of the shaker embraces the tree and is adjusted to the proper position by the opertaion of the hydraulic cylinders 79 and 84 by the movement of the four-way valves 102 located on the instrument board 95.

The extension tables 23 are then spread out their full distances under the tree. The box conveying belts 53 and 61 are operated as above described through their clutches 55 and 62 from the drive shaft 55A by either the sorter sitting on seat 50 or the operator sitting on seat 67.

Due to the fact that ground surfaces are not always level, the machine can be raised vertically by the hydraulic cylinders 5 by way of the three-way control valves 105, either simultaneously or each one individually, depending upon the angle of ground surface. The hydraulic cylinder 8 supporting the forward end of the frame 1 is operated independently by the four-way control valve 106 by the operator of the picker, or the control valve 106 may be automatically controlled in the following manner.

Ground contact points 107 are pivotally mounted at 108 or 109 respectively to the frame 1 of the machine. The object of these shoes is to automatically keep the frame of the picker in a more or less level condition in the following manner. The valve 106 is held in a neutral or central position as shown by the spring 110 pulling on the lever 111, cables 112 and 113 are trained about the pulleys 114, holding the shoes 107 in the position illustrated in Figures 2 and 8. In the event either of these shoes strikes the ground surface due to hilly terrain, the cables 112 and 113 will be pulled, moving the lever 111 of the valve 106 so as to either raise or lower the piston within the cylinder 8, pivoting the frame 1 about the points 7 of the piston rod 6 of the cylinders 5, maintaining the frame of the machine in a relatively level condition. This automatic levelling is one of the outstanding features in the structure of my nut and fruit picking machine.

The valve 106 may be operated manually from the control panel 95 by the operator sitting on the seat 67. After the picker has been brought to the position under the tree, the shaker 74 is brought into operation, being operated by the air contained within the container 92 by controls not here shown.

What I claim is:

1. A nut and fruit harvesting apparatus, comprising a mobile track supporting unit, a frame mounted on said mobile track supporting unit and having a longitudinal slot extending from the front end past the center thereof to accommodate a tree trunk, a pair of longitudinal conveyors respectively on each side of said slot, a driving roller and an idler roller mounted on said frame at the opposite sides of the slot to support the conveyors in longitudinal relation to each other, inclined deflectors positioned on said frame within said slot between said conveyors, a pair of deflectors respectively pivoted on said frame at opposite sides of the outer end of said slot and movable between positions opening said slot to permit passage of a tree trunk and closing said slot in oppositely inclined relation to deflect toward said conveyors, outer tables pivoted on the outer sides of said frame, and extension tables movably supported by said outer tables for movement between storage positions coinciding with said outer tables and operative positions extending beyond the outer edges of said outer tables.

2. An apparatus as defined in claim 1, including power means on said frame for driving said mobile track supporting unit, hydraulic pressure means on said frame, hydraulic jacks connected with said pressure means for respectively operating said inner, outer and extension tables, and control means connected to said pressure means for selectively actuating said jacks.

3. An apparatus as defined in claim 2, including a plurality of hydraulic jacks on said mobile track supporting unit and supporting said frame, said jacks being connected to said pressure means and said control means for selective operation to regulate the angle of said frame relative to said mobile track supporting unit.

4. An apparatus as defined in claim 3, wherein there are frame supporting jacks at both the front and the rear of said mobile track supporting unit, control levers are pivotally mounted on the front corners of said frame and extend below said frame for ground contact, and control means for the front of said jacks and connected with said levers for actuation upon ground contact by said levers.

References Cited in the file of this patent

UNITED STATES PATENTS

| Number | Name | Date |
| --- | --- | --- |
| 105,333 | Hooton | July 12, 1870 |
| 1,380,033 | Bagnall | May 31, 1921 |
| 1,473,081 | Cook | Nov. 6, 1923 |
| 1,626,068 | Bartlett | Apr. 26, 1927 |
| 2,159,311 | Berger | May 23, 1939 |